US006219839B1

United States Patent
Sampsell

(10) Patent No.: US 6,219,839 B1
(45) Date of Patent: Apr. 17, 2001

(54) ON-SCREEN ELECTRONIC RESOURCES GUIDE

(75) Inventor: Jeffrey Brian Sampsell, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/263,911

(22) Filed: Mar. 5, 1999

Related U.S. Application Data

(60) Provisional application No. 60/085,127, filed on May 12, 1998.

(51) Int. Cl.[7] .................................................. H04N 5/445
(52) U.S. Cl. .................................. 725/40; 725/49; 725/51
(58) Field of Search ............................... 348/7, 13, 564, 348/906; 345/327, 353, 969, 340; 340/825.01

(56) References Cited

U.S. PATENT DOCUMENTS

| | | |
|---|---|---|
| 4,706,121 | 11/1987 | Young . |
| 4,908,713 | 3/1990 | Levine . |
| 5,473,317 * | 12/1995 | Inomata et al. .................. 340/825.25 |
| 5,550,576 * | 8/1996 | Klosterman ............................... 348/6 |
| 5,684,525 | 11/1997 | Klosterman . |
| 5,995,155 * | 11/1999 | Schindler et al. .................... 348/461 |
| 6,005,565 * | 12/1999 | Legall et al. .......................... 345/327 |
| 6,072,483 * | 6/2000 | Rosin et al. ........................... 345/335 |

* cited by examiner

Primary Examiner—Nathan Flynn
(74) Attorney, Agent, or Firm—Robert D. Varitz, PC

(57) ABSTRACT

A system for providing an on-screen electronic resource guide (ERG) includes an audio/visual display device; plural peripheral devices, each having an active mode and an inactive mode; an interface located between said audio/visual device and said peripheral devices; and an ERG generator for providing an ERG display for displaying programming available to said audio/visual display device from said peripheral devices when such devices are in their active mode. A method for providing an on-screen electronic resource guide (ERG) in an audio/visual display device having plural peripheral devices connected thereto over an interface, wherein each peripheral device has an active mode and an inactive mode includes generating an ERG display for displaying programming available to the audio/visual display device from said peripheral devices when such devices are in their active mode, and controlling a peripheral device from the ERG display.

20 Claims, 8 Drawing Sheets

Fig. 7

| | 8:00 | 8:30 | 9:00 | 9:30 | 10:00 |
|---|---|---|---|---|---|
| ABC SERVICE | ▨ | ▨ | | | ▨ |
| ESPN SERVICE | | ▨ | ▨ | ▨ | ▨ |
| INFO SERVICE | ▨ | ▨ | ▨ | ▨ | ▨ |
| RCVR | [DESCRIPTION OF VIDEO RECEIVER IDENTITY OR CAPABILITIES] | | | | |

Fig. 8

| | 8:00 | 8:30 | 9:00 | 9:30 | 10:00 |
|---|---|---|---|---|---|
| NBC | ▨ | ▨ | ▨ | ▨ | ▨ |
| ESPN | ▨ | ▨ | | ▨ | ▨ |
| ESPN SERVICE | ▨ | ▨ | ▨ | ▨ | ▨ |
| ESPN SERVICE (VIA PC) | ▨ | ▨ | | ▨ | ▨ |
| INFO SERVICE | ▨ | ▨ | ▨ | ▨ | ▨ |
| PC | [DESCRIPTION OF PC IDENTITY OR CAPABILITIES] | | | | |

Fig. 11

PLEASE SPECIFY THE DEVICES THAT YOU HAVE
CONNECTED TO THIS TELEVISION
THEN SELECT THE APPROPRIATE CONTROL CODES

| | DEVICE TYPE | CONTROL CODE |
|---|---|---|
| VIDEO 1 IS FROM | VCR #1 | SHARP |
| VIDEO 2 IS FROM | VCR #2 | SONY |
| AUXILIARY 1 IS FROM | LSR DISC | RCA |
| AUXILIARY 2 IS FROM | DVD | SHARP |
| AUXILIARY 3 IS FROM | CABLE | MOTOROLA |
| AUXILIARY 4 IS FROM | DBS | UKNOWN |
| o | | |
| AUXILIARY N IS FROM | WWW | |
| OUTPUT 1 GOES TO | VCR #1 | SHARP |
| OUTPUT 2 GOES TO | VCR #2 | SONY |
| OUTPUT 3 GOES TO | SUR SND | SHARP |

110

ON-SCREEN ELECTRONIC RESOURCES GUIDE

This application claim benefit to provisional application Ser. No. 60/085,127, filing date May 12, 1998.

FIELD OF THE INVENTION

The invention is a user interface and method to control the operation of multiple components in an audio/visual (A/V) system. It is extensible to networked information systems where each component of the system has configurable physical parameters analogous to A/V capabilities, such as storage, display, and input/output devices, and separable, i.e., self sufficient, deliverable data products analogous to A/V channels and programs.

BACKGROUND OF THE INVENTION

Electronic Programming Guides (EPGs) are available to allow TV viewers to browse an X/Y array of video programs, usually organized with time along the horizontal axis, channels along the vertical axis, and programming information placed in the body of the array. One such system is disclosed in U.S. Pat. No. 4,706,121 to Young. Such EPGs may be built into TV receivers where they may control the tuning functions of the TV receiver itself. An EPG may also be built into a TV receiver and made capable of controlling the tuning and/or program selection of an A/V peripheral program source, such as a cable Set-Top-Box (STB) box or satellite Integrated Receiver Decoder (IRD). The EPGs may also be built directly into the STB or IRD so that the TV receiver functions only as a monitor. Alternatively, the EPG may be built into a separate box that controls the TV, an A/V peripheral, or both.

A number of consumer electronics companies are working on schemes to implement home A/V network infrastructures, such as the Home Audio Visual Interoperability (HAVi) standard. The nodes, or appliances, that will become part of such networks generally will include a user interface (UI) that provides control of the particular appliance, and provides access to the UIs of the other appliances on the network. This is being done against a background of a flashing "12:00"—a sometimes not so funny joke concerning the inability of users to perform basics functions with consumer electronics, such as setting the clock function on a VCR. New appliances must be truly plug-and-play if they are to be purchased and used by the consuming public.

It is also recognized that, as new appliances come on the market, very few consumers will scrap old appliances, or "legacy" equipment, to purchase a full system incorporating all of the new features. The new networks should therefore accommodate both the new appliance and the legacy appliance. A primary emphasis of some manufacturers has been the proposed inclusion of some appliance intelligence regarding the interconnectivity of the appliance within a network. This enables the appliance to assist the user during connection and operation of the appliance. Regardless of how well the appliances "find their way" in the networks, there will always be scenarios wherein a user is required to configure a network to accept a particular appliance, or to configure an appliance to meld into the network. There will always be unexpected situations, and products having unforeseen capabilities, that will require a user to facilitate seamless network operation. What is foreseeable is that a UI will need to be provided to assist the user with the unforeseeable. There are likely to be individual, proprietary, approaches to user interfaces.

The predominant EPG format is a X/Y grid, wherein a channel is displayed on one axis, time is displayed on the other axis, and the grid is filled with programming information. Although some believe that the X/Y grid metaphor has a limited future, even though it has been in use since the advent of the television age in the 1950's, any scheme which may replace the X/Y grid must still provide the same information contained in the grid, and must allow a user to navigate through that information. Thus, any EPG based on the X/Y grid metaphor may move smoothly to any new scheme that may replace the grid as the fundamental navigational paradigm.

Some A/V peripherals, such as Digital Video Disc (DVD) players and advanced video recorders, present an on-screen menu that allows a viewer to review the content of the programming on the media within the peripheral and to control the peripheral so as to view and control the presentation of that programming.

None of the known prior art, however, includes an Electronic Resources Guide (ERG) that is capable of recognizing that a new A/V peripheral has been added to a network, learning how the peripheral is connected within the viewer's A/V system or network, integrating that information into a guide for the network, and then displaying that information so that the user may control and view the programming provided by the new peripheral much the same as a user may select to view broadcast programming displayed in an EPG.

It is important that an ERG control a peripheral without the control codes of that peripheral being previously known to the ERG. It is also important that an ERG effectively control a peripheral regardless of the manner in which the peripheral is connected within the A/V network.

Prior art systems are known that provide a mechanism for interaction with an index for material recorded on video tape. Such a system is disclosed in U.S. Pat. No. 4,908,713 to Levine, wherein an index for video tapes is created as programs are recorded under the control of the EPG. The index is held in the EPG system memory. When a tape is inserted in the VCR, the EPG searches the tape for a correspondence between any of the several indexes in memory and the items stored on the tape. Upon finding such a correspondence the EPG assumes the index is the correct one for the tape and allows the user to access the material on the tape by using the index.

System are known that allow the merging of EPG data from several sources, but always within the context of EPG information of a common type for a common application. No mention is ever made of using the merged information for any purpose other than selecting TV programs from an array of times and channels. Such systems are disclosed in U.S. Pat. Nos. 5,550,576 and 5,684,525, both to Klosterman.

None of the known prior art teaches or suggests using an ERG to control different types of peripherals, such as laser disc players or DVDs. The prior art does not discuss controlling unknown types of peripherals that must first register themselves with the ERG, does not discuss treating non-video streams, such as data services, within the ERG, nor does the prior art address methods to register peripherals within the ERG so that they may be treated as program sources within the ERG in the same way as broadcast channels are so treated.

SUMMARY OF THE INVENTION

A system for providing an on-screen electronic resource guide (ERG) includes an audio/visual display device; plural peripheral devices, each having an active mode and an inactive mode; an interface located between said audio/visual device and said peripheral devices; and an ERG generator for providing an ERG display for displaying programming available to said audio/visual display device from said peripheral devices when such devices are in their active mode.

A method for providing an on-screen electronic resource guide (ERG) in an audio/visual display device having plural peripheral devices connected thereto over an interface, wherein each peripheral device has an active mode and an inactive mode includes generating an ERG display for displaying programming available to the audio/visual display device from said peripheral devices when such devices are in their active mode, and controlling a peripheral device from the ERG display.

An object of the invention is to provide a method that allows one or more independent A/V, or data service, peripherals to be registered by a host, such as a TV, VCR, or STB, as to the peripheral's connectivity to that host.

A further object of the invention is to provide a method that allows peripherals so registered to a host to inform the host of programming that the peripheral may provide to the host, wherein the programming is any of several natures such as video, audio, or data.

Another object of the invention is to provide a means for the programming information provided by the peripheral to be installed in an ERG or ERG-like software environment within the host.

Another object of the invention is to provide a means for a viewer to interact with the information displayed within the ERG or ERG-like environment.

Yet another object of the invention is to provide a means for the host to control the peripheral in accordance with the wishes of the viewer conveyed through the interactive means provided.

These and other objects and advantages of the invention will become more fully apparent as the descriptions which follows is read in conjunction with the drawings.

BRIEF DESCRIPTION OF THE DRAWINGS

FIG. 7 depicts a PC X/Y grid ERG.

FIG. 8 depicts a PC X/Y grid ERG displayed on a video receiver.

FIG. 11 depicts a registry screen of the invention.

DETAILED DESCRIPTION OF THE PREFERRED EMBODIMENT

Figure 1:
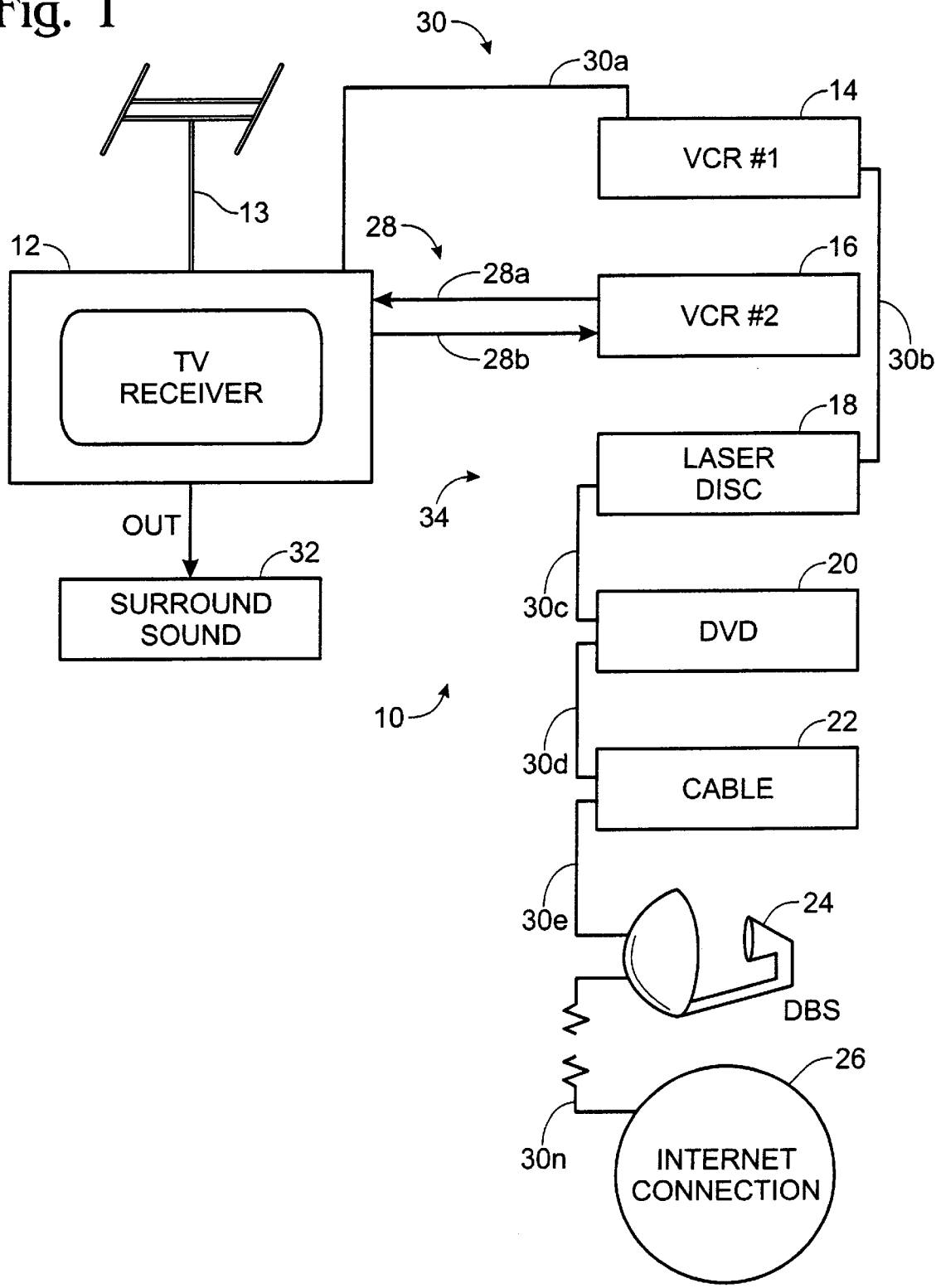
FIG. 1 is a block diagram of the system of the invention.

An Electronic Resources Guide (ERG) displays available system components of a number of A/V devices connected to a network, while an Electronic Programming Guide (EPG) displays the programming available on or from a component. An ERG may incorporate one or more EPGs. Referring now to FIG. 1, a preferred embodiment of the system of the invention is depicted generally at 10. System 10 includes an audio/video (A/N) devise, such as TV receiver 12, that contains an electronic resources guide generator to generate an electronic resource guide (ERG) and an electronic program guide (EPG) therein, each of which may be presented as an on screen display (OSD). Receiver 12 is connected to a conventional TV antenna 13. System 10 further includes a number of peripherals, such as VCR #1, 14, VCR #2, 16, a laser disc player 18, a digital video disc (DVD) player 20, a cable service 22, a direct satellite broadcast receiver 24, and a data connection, such as an internet service 26.

All of the peripherals are connected to receiver 12 by one of two interfaces: The first interface 28, is a traditional connection between receiver 12 and VCR #2, which generally takes the form of a three-cable input 28a, and three-cable output, 28b. VCR #2 is referred to herein as "legacy" equipment. The remaining components are connected over a digital interface 30 and includes cables 30a, 30b, etc., which are daisy chained between the components of system 10, providing a networked environment for receiver 12 and the components, or appliances, connected by interface 30. Cables 30 are also known as Firewire® cables, which comply with IEEE standard 1394, and which form the digital interface between receiver 12 and the remaining components of system 10. It will be appreciated that other forms of digital interfaces may be used, some of which are identified later herein. Conventional connections may be provided between receiver 12 and surround sound system 32. When a peripheral or receiver 12 is turned on, it is in an active mode, and will communicate with any other appliance on the network that is also in an active mode. When an appliance is turned off, it is in an inactive mode. In some instances, the network and the ERG may be used to change the mode of an appliance, i.e., an appliance may be turned on by a command given by, for instance, receiver 12, which in the first instance, receives a command from the user, or from a programming module, which instructs a peripheral to become active at a predetermined time.

It will be appreciated that, using IEEE 1394, any component of system 10 may be used as the "control" unit as decided by the user. Interface 30 and the IEEE 1394 compliant appliances are referred to herein as a network 34.

Figure 2:
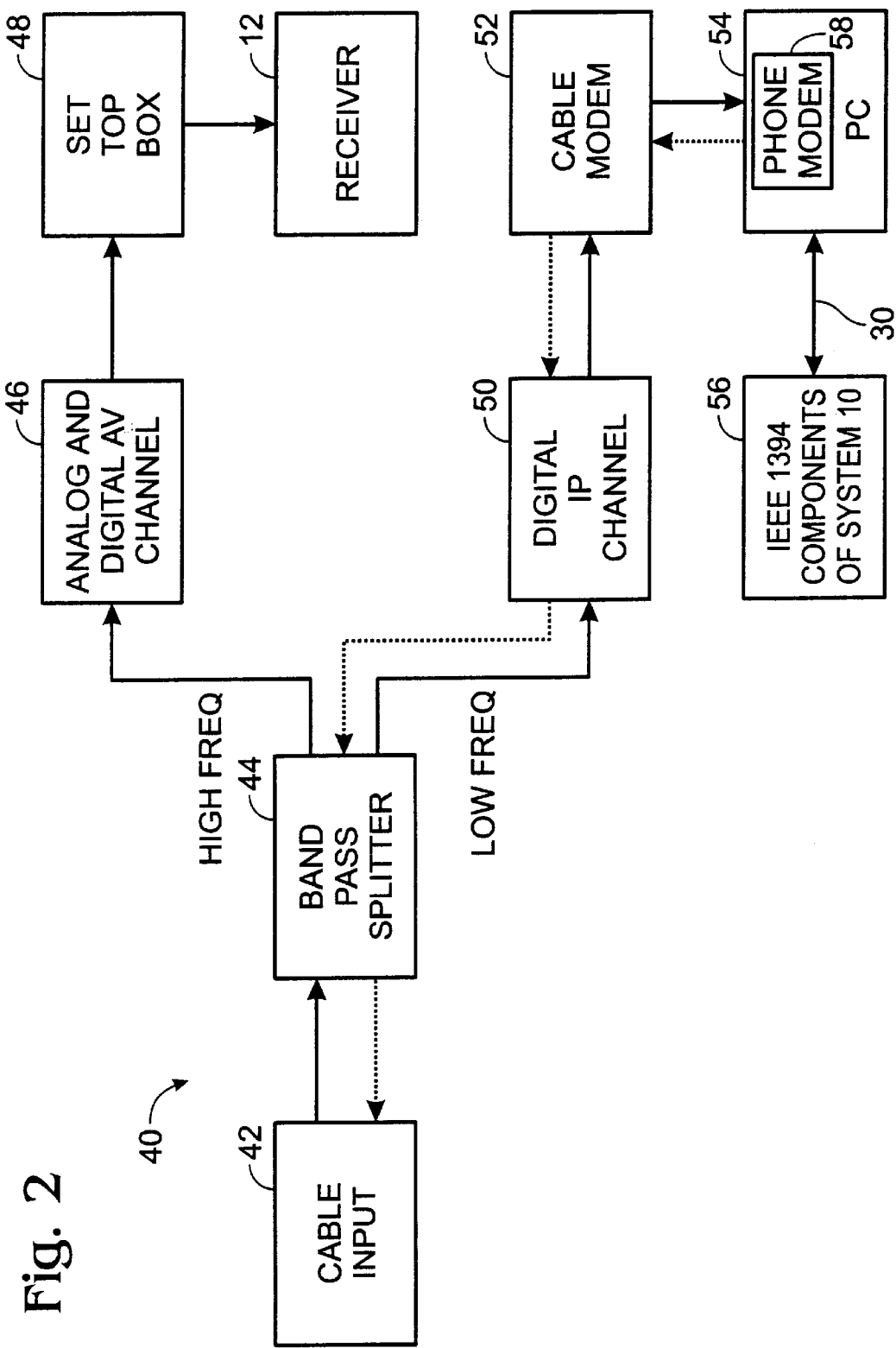
FIG. 2 is a block diagram of a cable terminal for delivering a variety of data streams.

Referring now to FIG. 2, a cable input and signal splitting system is depicted generally at 40. A cable input 42 provides a full RF spectrum of signals to a band pass splitter 44, which divides the signals into high frequency and low frequency signals. The high frequency signals include analog and digital A/V channel signals 46, which are input to a set top box (STB) 48, and then to receiver 12.

Low frequency signals include digital internet protocol (IP) channel signals 50, which are initially decoded by a cable modem 52 and then input to PC 54. PC 54 may provide inputs to the IEEE 1394 components of system 10, block 56, over digital interface 30, thereby becoming an appliance on the network. Additionally, traditional phone communications may be handled through phone modem 58, located in PC 54. The dotted-line reverse arrows between cable input 42 and PC 54 represent the signals transmitted over cable modem 52 by PC 54.

Figure 3:
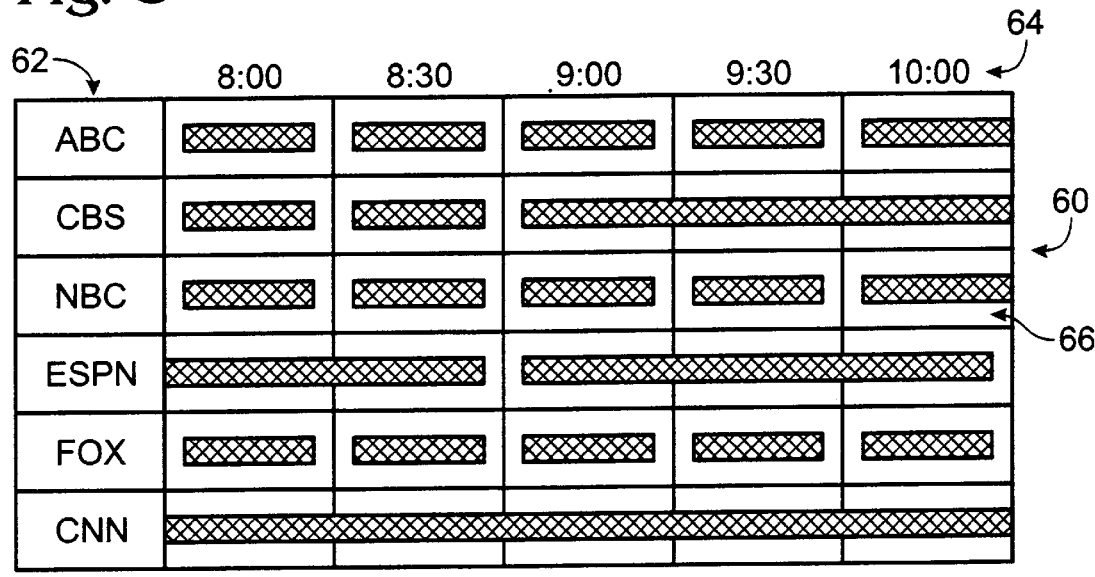
FIG. 3 depicts a traditional X/Y grid EPG.

Now that the components are connected, and signals are moving over the network from the cable, the DVDs, tapes, CDs, etc., the user must decide what form of programming is viewed. This is where the ERG of the invention comes into play. It should be noted that 'programming' as used herein means any source of audio visual material that may be viewed or listened to on system 10. The ERG, and associated EPG, displays program, channel and time information in an X/Y grid, as shown in FIG. 3, at 60. Channel, or station, identifiers appear in a left, source column, 62, time appears in a top, time row, 64, and programming information appears in the body of the grid, 66.

A UI provides a way for the user to move a cursor through the various channels and times so that the user can view the program choices available on any given channel at any given time. The UI typically provides a simple method to tune the receiver to the channel associated with the cursor location if the associated time coincides with the actual time. If the times do not match, most EPGs provide a simple scheduling protocol to schedule viewing/recording (solely for the personal use of the user and only for purposes of time-shifting) of programs in the future.

Figure 4:
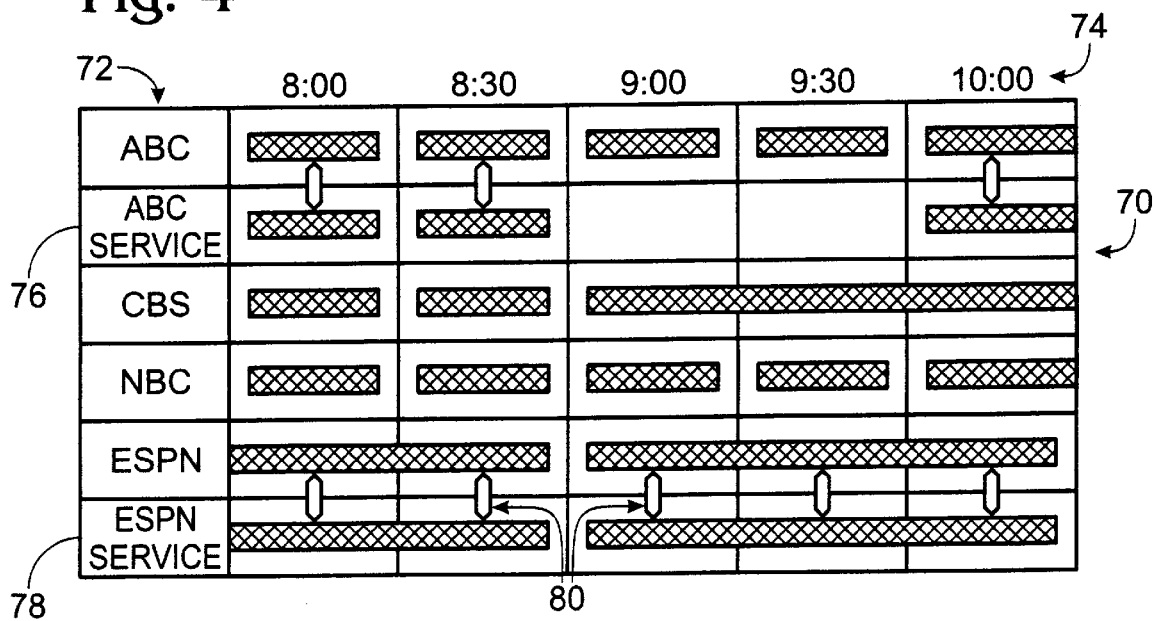
FIG. 4 depicts an X/Y grid ERG having broadcast data services displayed thereon.

In the ERG of the invention, a portion of which is shown in FIG. 4, generally at 70, the channel list also includes other sources of programming on the network. The other sources may be selected in the same manner used for 'tunable' channels, and will appear in a source column, 72, arranged in an X/Y grid with a time row 74. As a peripheral is activated, any programming information from that peripheral is included in the ERG, which is updated as the peripheral comes on line. For instance, if receiver 12 is operating from cable system 22, the broadcast information for the cable channels of cable system 22 are displayed by the ERG, possibly along with any programming being received from antenna 13. If DBS 24 is activated, programs available from the satellite system will be displayed as rows on the ERG. It will be appreciated that the terms 'columns' and 'rows' are used herein in connection with an ERG display having an X/Y grid format. Other formats may use entities equivalent to columns and rows to accomplish the transfer of information from the system to the user.

Some broadcast programs may have "data services" associated therewith, which are indicated by rows 76, 78. Selecting a given data service may or may not cause a video stream to be directed to the display on receiver 12. Links, represented by vertical bars 80, indicate that there is data relevant to the broadcast signal being transmitted on the data service which is transmitted with the broadcast video signal. Such a selection may activate receiver 12's data processing software and link that software to the associated data stream. Alternately, the user may elect to have the configuration utility of receiver 12 direct data service streams to receiver 12's network connection. It should be noted that a video stream may also be displayed on a monitor associated with PC 54. Alternately, PC 54 may direct its video output to receiver 12, either as a full-frame display or a picture-in-picture (PIP) display, assuming implementation of proper communication protocols, which are beyond the scope of this disclosure.

Figure 5:
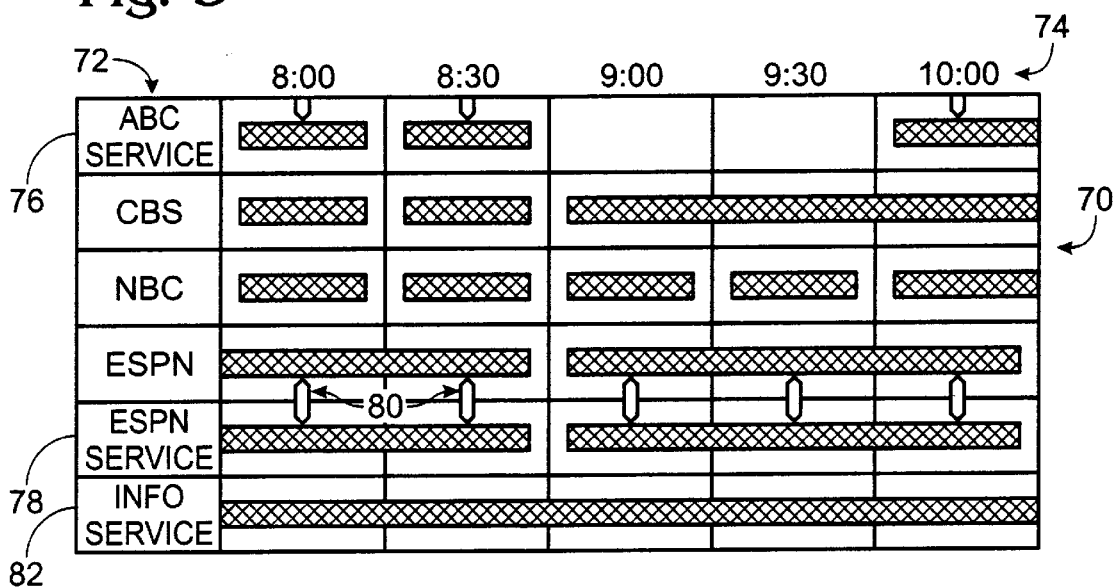
FIG. 5 depicts an X/Y grid ERG having broadcast data services and links to broadcast channels displayed thereon.

Data services from other appliances, such as PC 54 and internet connection 26, in system 10 may also appear in the ERG grid, as shown in FIG. 5, at 82. When a user selects such a service, the ERG links the data stream from the net to receiver 12's data service processing software. These data services may also be directed across the network, which allows the data stream to be processed in another appliance on the network other than the appliance containing the EPG, i.e., a data service stream coming from receiver 12 may be directed to PC 54. To enable this type of communication, every component of system 10 that is compliant with the IEEE 1394 interface that supports the ERG 'registers' itself with every other component of the system. HAVi communication protocols provide for such relationship, however, the HAVi protocol does not establish user interfaces, or provide an ERG as disclosed herein. It is likely that the network will resolve the flashing 12:00 problem for all of the components of system 10, save VCR #2, as a time signal may be captured from any of the broadcast channels and used to set a master clock somewhere in the network.

Figure 6:
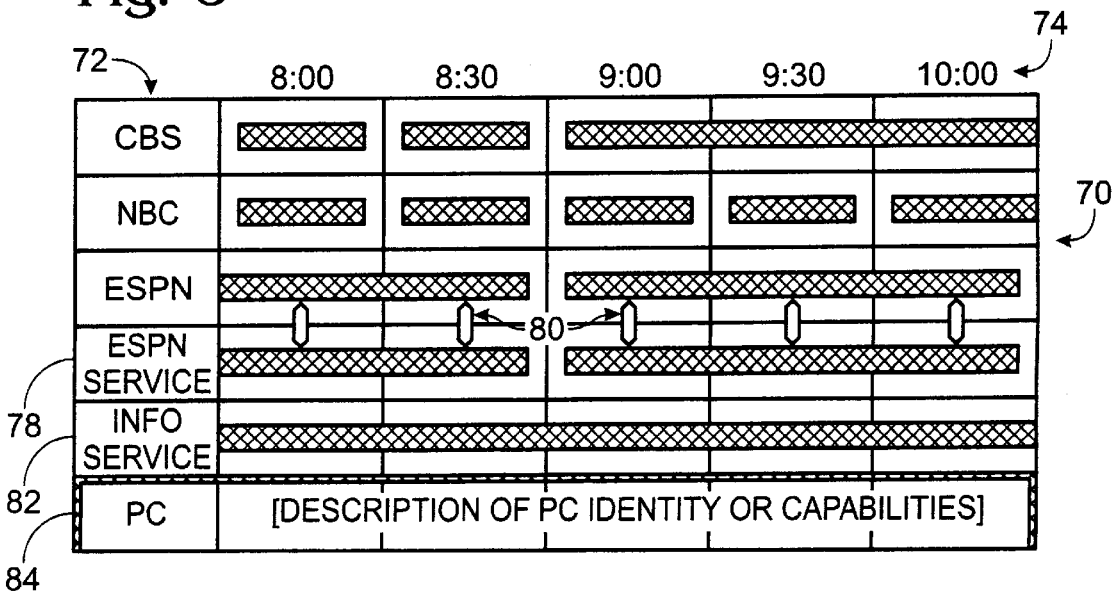
FIG. 6 depicts an X/Y grid ERG having broadcast data services, links to broadcast channels and a networked PC displayed thereon.

In order for a user to work with all of the networked appliances, a "presence row," such as row 84, in the ERG is reserved for each appliance, such as PC 54, on the network, as shown in FIG. 6. An appliance presence row, such as row 84, generally indicates that information about the appliance and a UI, or method for controlling the appliance, has been provided by the appliance, or by the user in the course of configuring the system for a particular appliance. The user may have customized the information provided by the appliance.

An appliance may have more than one row associated therewith, for instance, PC 54 may have several non-presence rows for video and data streams which are generated thereby, and may also have several presence rows for applications that may be running on the PC. As shown in FIG. 6, a single presence row is a 'place holder' for the PC, which will provide additional information upon request by the user. If a user wants the PC to process a data stream from the video receiver, the user may select the PC presence row from the ERG grid. The PC ERG will then appear on the video receiver display, where it may be further manipulated. Again, HAVi protocols support this type of activity.

Referring now to FIG. 7, a sample PC ERG is depicted, generally at 90, and includes a source column 92 and a time row 94. A number of data streams, or services, associated with traditional video channels are identified, and broadcast information is received from, for instance, receiver 12. The PC ERG displays rows 76, 78 and 82, and enables a user to see data services which are being forwarded from receiver 12. The user may view any other data services that are available on the network as 'channel' entries (not shown) similarly to the manner in which information is presented on receiver 12's ERG. The user may then select a data service entry to be processed by PC 54. The output of the data service may be viewed on the monitor associated with PC 54. Because it is highly probable that the PC monitor is not viewable alongside receiver 12, the user must then select receiver 12's presence row 96 on the PC ERG, or select a BACK function from receiver 12's OSD/REMOTE capability, to be returned to receiver 12's ERG. The output 100 from PC 54 of the originally selected data service now appears in receiver 12's ERG 70, as shown in FIG. 8, because PC 54 has made the rendered data service available to the network. As depicted in FIG. 8, the viewer has elected to render the ESPN data service on the PC, and may view the resultant service on receiver 12 by selecting the PC sourced occurrence of data service from the ERG on receiver 12.

Because data services can require a higher degree of processing power than that which is available in the appliance that initially receives the data stream, the ability to allow processing of a data stream by another appliance in the network is essential. This also permits the manufacture and distribution of relatively inexpensive data receivers, such as receiver 12 or VCR 14, for inclusion in the network, which are coupled with a more capable data processor, such as PC 54. The combination further allows the display of the data on yet a third appliance, such as a monitor associated with PC 54, or on receiver 12. While it is desirable that the relatively complex data routing that takes place on the network occur without human intervention, because of the flashing 12:00 problem, the capability must also exist for user configurable protocols in the event when the automatic configuration fails, when new forms of service become available, or because the user desires to customize the system to meet the user's specific needs.

Figure 9:
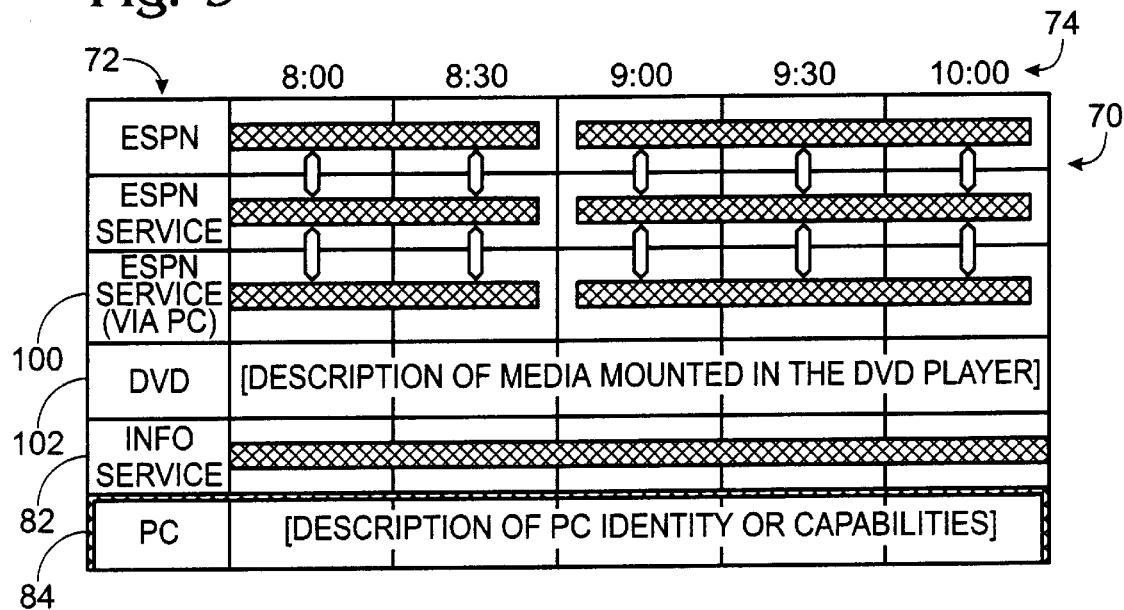
FIG. 9 depicts an X/Y grid ERG containing information for a stored media player.

The foregoing example demonstrates a relatively complex communication protocol and ERG capability. A more intuitive example is depicted in FIG. 9, where DVD 20, presence row 102, is used to provide programming. DVD 20 appears as a separate channel on ERG 70, and allows the user to view the DVD programming with the same ease as selecting a broadcast channel. DVDs contain encoded information about the contents thereof, which may include, for instance, a full length movie, director comments, celebrity interviews and information about products associated with the movie and ordering information for such products. All of this descriptive material may be displayed in the row associated with DVD 20, or in an information screen linked to the row associated with DVD 20, following common EPG protocols.

Figure 10:
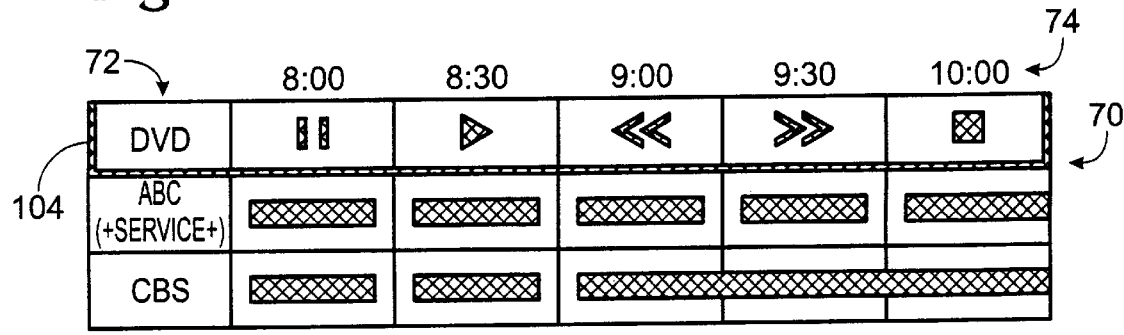
FIG. 10 depicts an X/Y grid ERG having control features for a stored media player displayed thereon.

FIG. 10 depicts how ERG 70 structure may be used to control networked appliances, such as DVD 20. The ERG provides a display of a small version of the full-screen grid, at the bottom of the display of receiver 12, for instance. As the user views the DVD programming, the small pop-up grid may be created an include on-screen controls 104 for the video stream functions. As networked VCRs and writable DVDs become more common, the ERG metaphor will easily comprehend the presence of such appliances on the network, as each appliance will have its own presence row in the ERG, just as do the PC and DVD described above. The user may select a writable DVD ERG, or networked VCR ERG, which will display the available, recordable video streams available on the network. The user may select a stream and arrange to record the stream using the DVD or VCR OSDs, which are served across the network along with the ERGs.

This provides the user with full access to all networked resources. The user may use the display and remote control of receiver 12 to route a signal from a source, such as DBS 24 or DVD 20, to a destination, such as VCR 14 or to a writable DVD. The user may control what happens at the destination appliance, and then return to viewing a program broadcast over internet 26 on receiver 12.

The previously described features represent but a fraction of the total capabilities that may be integrated into an ERG. The ability to deal with legacy equipment, however, is one of the most important of these features. The transition from stand-alone equipment to networked equipment will be neither smooth nor rapid. The reliability of currently available appliances guarantees that they will survive long into the networked era.

To be fully acceptable, and fully functional, an ERG may provide a way to accommodate legacy equipment, such as analog VHS, Hi8, and even Beta VCRs, represented by VCR #2, 16, in FIG. 1, in a manner that is indistinguishable from the way that digital, networked appliances are integrated into the network. This may be accomplished by use of the registry software of the invention, which is incorporated into each networked appliance. Using the example of receiver 12, the registry software begins execution as soon as receiver 12 detects the connection of a cable. The registry software may also be actuated by the user from a menu selection, or dedicated control button.

The registry software presents a user with the opportunity to select the identity of an attached piece of legacy equipment from a list of known equipment. In each case, when an input or output connection is made to a non-networked piece of legacy equipment, the registry establishes the type of connection and the identity of the connected appliance. Receiver 12 may then control the equipment with known codes through an IR transceiver. In the case where receiver 12 encounters unknown codes, the registry allows a user to select a generic class of product and directs the user to one-by-one press a sequence of keys on an IR remote control for the unknown appliance. Receiver 12 then learns the codes for the specific product and associates those codes with the ERG row for that product.

Once in control of a legacy product, receiver 12 creates a presence row for the product in the ERG. The mapping of interconnectivity is no longer a problem because the legacy equipment is now hardwired to a particular connection on a networked product, receiver 12 in this instance. The legacy product may, of course, be wired to any piece of networked equipment that will accommodate the connections for the legacy equipment, and the ERG will be programmed accordingly. In the event that a piece of legacy equipment is to be connected to provide an input to one networked appliance and receive an output from a second networked appliance, it is necessary for the user to execute a first registry program for the first networked appliance, and then to execute a second registry program for the second networked appliance.

Referring now to FIG. 11, a registry screen of the invention is depicted generally at 40. Receiver 12, as previously noted, contains an EPG/OSD which generates registry screen 110. The registry screen will appear upon a menu select command initiated by a user of the system, or may appear when receiver 12 detects that a new peripheral device has been added to system 10. Registry screen 110 allows the user to inform the EPG/OSD which input, i.e., video #1, video #2, Aux 1–n, and what format of input is in use to connect the video or audio or data stream from a peripheral, i.e., device type, to the host. Appliances forming network 34 are identified and generally indicate proper device types and control codes. The screen also allows the user to select a control scheme, including an appropriate set of commands, or control codes, for the peripheral from the host's internal set of control codes. Outputs are similarly identified to the user, i.e., Output #1, Output #2, etc. Selecting the "device type" column provides a pull-down menu having various selection therein corresponding to generally used peripherals, such as VCR #1, VCR #2, laser disc, cable, direct broadcast satellite (DBS), DVD, etc. When a device is specified in the "device type" column, the "control code" column allows the user to choose from a pull-down menu of manufacturers and model identification.

Figure 12:
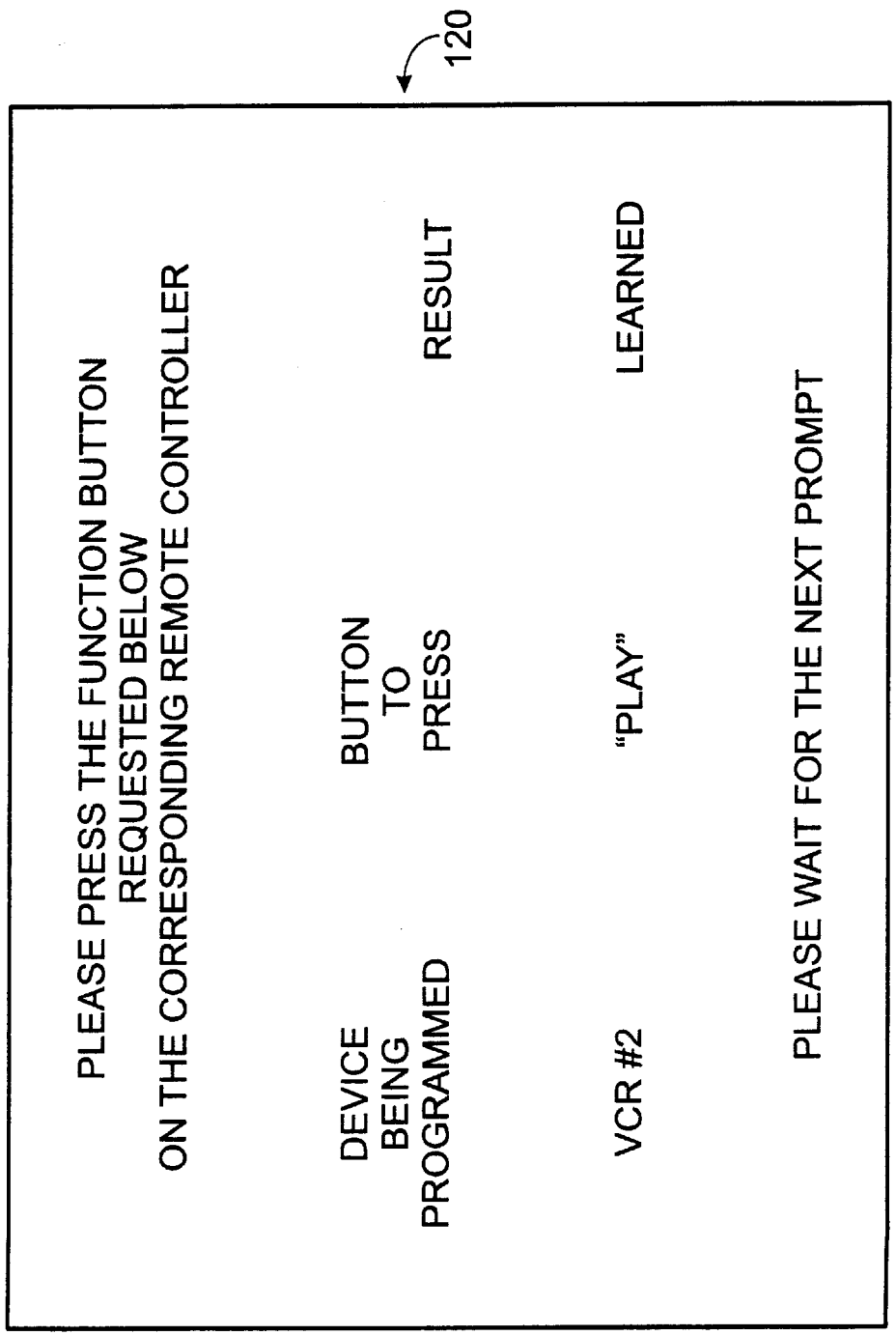
FIG. 12 is a learning screen of the invention.

Referring now to FIG. 12, a learning screen is depicted generally at 120. In the event that the necessary control codes are not resident in the host's memory, a predefined learning sequence is invoked to build such a set of codes. The learning sequence is based on a set of generic code parameters for common peripherals. In the event that the peripheral in question lies outside the span of the stored set of classes of peripherals, a primitive learning algorithm is invoked that allows the user to encode newly defined parameters. However, it is doubtful that this lowest level of programming will be invoked due to the rarity of truly new classes of peripherals, for instance, the DVD commands are a subset of existing laser disc and VCR commands, and in many cases, because of the impatience of most users who will elect not to deal with such primitive interfaces. "Device Being Programmed" is selected as an option for the registry screen "Control Code" column. All functions shown on the learning screen are programmed in turn until "Good" results are achieved, as will be indicated by a "learned" message or icon in the "Results" column.

A sample ERG control screen is depicted in FIG. 10. The host unit EPG/OSD is capable of building "Channel Lines" or "EPG Entries", from the raw data provided during the registry screen and learning screen sessions, as well as from data provided by the legacy components across interfaces 28.

The ultimate capability of the ERG/OSD is limited only by the existence of supported digital interfaces between the host and the peripheral. No digital interface need be supported to implement VCR, DVD or IRD control using the ERG as a control panel. The functions of such peripherals are well know and the building of iconic or text "buttons" within the EPG to control such peripherals is straightforward. The body of the ERG is filled with program and channel information. One, or as many as needed, lines of the ERG may be used by the OSD for peripheral control and I/O configuration functions. Varied control metaphors may appear on control button row 104, such as program sections from a VCR. Non-video data services, such as internet access, may also be selected, if available, from the subject peripheral.

In order to do more than simply control A/V or information peripherals, an interface between the host and the A/V peripheral, is provided. Information such as the title, subject, and run-time of the programming to be supplied by the peripheral is communicated to the host over this interface, in order for the information to appear in the ERG. Appropriate interfaces for this communication include I2C, USB, and IRDATA channels. High bandwidth interfaces, such as IEEE-1394 may be used and will support transport of A/V signals in addition to the channel information. The HAVi standard is based on the IEEE-1394 bus, which encompasses both video and data capabilities, and which may also be used.

Operation and Method

Registry screen 110 and appropriate software, likely present in receiver 12, or in any of the compliant appliances of network 34, maps I/O from peripherals to the I/O connections of receiver 12 and maps an appropriate set of commands, IR or bus, from control button row 104 selections on the ERG to the associated functions of the peripherals. Learning screen 120, its associated software and an associated learning process facilitates the mapping of IR or bus commands not stored in the receiver between button selections 104 on the ERG and the associated functions of the peripherals. Optionally, a bus interconnection between the receiver and the peripherals allows detailed information related to the programming available from the peripheral to be mapped onto the EPG button selections.

The result is that the viewer ultimately is enabled to use a familiar EPG, or EPG-like, interface, a familiar controller and set of control metaphors resident in an A/V host unit to control and view programming from an independent A/V peripheral whose existence may not have been foreseen at the time of the manufacture of the host unit.

Although a preferred embodiment of the system and method of the invention have been disclosed herein, it will be appreciated that further variations and modification may be made thereto within the scope of the invention as defined in the appended claims.

I claim:

1. A system for providing an on-screen electronic resource guide (ERG), comprising:

an audio/visual display device;

plural peripheral devices, each having an active mode and an inactive mode, wherein at least one of said peripheral devices has an electronic programming guide (EPG) associated therewith;

an interface located between said audio/visual device and said peripheral devices;

an ERG generator for providing an ERG display for displaying information about available programs to said audio/visual display device from said peripheral devices when such devices are in their active mode; and wherein any EPGs are incorporated into said ERG display, wherein said programs are taken from the group of programs consisting of broadcast television; cable television; direct satellite broadcast; video cassette recorders; digital video discs; CD-ROMs and computer-based programs including internet transmissions multimedia programs, streaming video and audio programs; and wherein an active peripheral is indicated by at least one presence row on said ERG display and wherein an ERG associated with said peripheral is displayed when said presence row for the peripheral is selected.

2. The system of claim 1 wherein said information about available programs is displayed on said ERG display as a single entity, and wherein the content of a program will be displayed to a user when said entity is selected.

3. The system of claim 1 wherein a program may have multiple rows associated therewith on said ERG display when the program is processed by multiple peripheral devices.

4. The system of claim 1 wherein a broadcast channel is represented by a row on said ERG, and wherein an associated data stream is represented by a linked row on said ERG.

5. The system of claim 1 wherein said peripheral device may be controlled from said ERG, wherein said ERG includes a registry for mapping input/output with said peripheral devices on said interface and for mapping a set of standard commands from the EPG to the associated function of the peripheral device, and wherein said ERG includes a learning mechanism to facilitate mapping of non-standard commands between a peripheral device and said audio/visual device.

6. The system of claim 5 wherein said registry includes a device type registry and a control code registry to provide entry of appropriate control schemes for each peripheral device.

7. The system of claim 6 wherein said device type registry includes a menu having multiple device types listed thereon.

8. The system of claim 6 wherein said control code registry includes a menu having multiple control codes listed thereon.

9. The system of claim 5 wherein said interface includes plural input/output ports on said audio/visual device.

10. A method for providing an on-screen electronic resource guide (ERG) in an audio/visual display device having plural peripheral devices connected thereto over an interface, wherein each peripheral device has an active mode and an inactive mode, and wherein at least one of the peripheral devices has an electronic programming guide associated therewith; comprising:

generating an ERG display for displaying information about available programs; wherein the programs are taken from the group of programs consisting of broadcast television; cable television; direct satellite broadcast; video cassette recorders; digital video discs; CD-ROMs and computer-based programs including internet transmissions multimedia programs streaming video and audio programs; to the audio/visual display device from said peripheral devices when such devices are in their active mode, wherein any EPGs are incorporated into the EPG, and controlling a peripheral device from the ERG display; and indicating an active peripheral by displaying at least one presence row on the ERG display and displaying any EPG associated with the peripheral which is displayed when the presence row for the peripheral is selected.

11. The method of claim 10 which includes displaying information about available programs on the ERG display as a single entity and which includes displaying the content of a program when the entity is selected.

12. The method of claim 10 which includes processing a program by multiple peripheral devices and displaying multiple rows for a program so processed on the ERG display.

13. The method of claim 10 which includes representing a broadcast channel by a row on the ERG display, and representing an associated data stream for the broadcast channel by a linked row on said ERG display.

14. The method of claim 10 which includes dynamically updating the ERG display when a peripheral changes from one mode to another mode, and which includes registering a set of standard commands, between an audio/visual device having an electronic programming and a peripheral device, a map of input/output channels between the audio/visual device and the peripheral device, and includes training the ERG to facilitate mapping of non-standard commands between a peripheral device and the audio/visual device.

15. The method of claim 14 wherein said registering includes providing a device type registry for identifying a specific peripheral to the audio/visual device.

16. The method of claim 14 wherein said registering includes providing a control code registry for identifying a specific peripheral control scheme to the audio/visual device.

17. The system of claim 1 wherein said ERG display is taken form the group of displays consisting of:

a full screen EPG display having associated services displayed thereon;

an EPG screen display having associated services overlaid thereon;

a full screen EPG display having non-associated services displayed thereon;

an EPG screen display having non-associated services overlaid thereon;

a screen display of EPG rows with peripheral device control rows displayed thereon; and a screen display of EPG rows with output selection rows displayed thereon.

18. The system of claim 1 wherein an EPG is generated by said ERG generator for any peripheral device which does not have an EPG associated therewith when received by the system.

19. The method of claim 10 wherein said generating an ERG display includes generating an ERG display taken from the group of ERG displays consisting of:

a full screen EPG display having associated services displayed thereon;

an EPG screen display having associated services overlaid thereon;

a full screen EPG display having non-associated services displayed thereon;

an EPG screen display having non-associated services overlaid thereon;

a screen display of EPG rows with peripheral device control rows displayed thereon; and a screen display of EPG rows with output selection rows displayed thereon.

20. The method of claim 10 which includes generating an EPG is by an ERG generator for any peripheral device which does not have an EPG associated therewith.

* * * * *